United States Patent
Fuchigami et al.

(10) Patent No.: US 8,091,449 B2
(45) Date of Patent: Jan. 10, 2012

(54) STEERING APPARATUS

(75) Inventors: Shinichi Fuchigami, Maebashi (JP); Masaharu Igarashi, Maebashi (JP); Satoru Nagasawa, Maebashi (JP); Masaya Jouta, Maebashi (JP)

(73) Assignee: NSK Ltd., Tokyo (JP)

( * ) Notice: Subject to any disclaimer, the term of this patent is extended or adjusted under 35 U.S.C. 154(b) by 1063 days.

(21) Appl. No.: 11/953,905

(22) Filed: Dec. 11, 2007

(65) Prior Publication Data
US 2008/0141817 A1 Jun. 19, 2008

(30) Foreign Application Priority Data

Dec. 15, 2006 (JP) ................................. 2006-338217
Jun. 25, 2007 (JP) ................................. 2007-166981

(51) Int. Cl.
B62D 1/18 (2006.01)
(52) U.S. Cl. ........................................ 74/493; 280/775
(58) Field of Classification Search .................. 74/492, 74/493; 280/775
See application file for complete search history.

(56) References Cited

U.S. PATENT DOCUMENTS

| 5,606,891 | A | 3/1997 | Tisell et al. |
| 5,931,501 | A | 8/1999 | Baumann et al. |
| 5,943,916 | A | 8/1999 | Baumann et al. |
| 6,095,012 | A | 8/2000 | Lutz |
| 7,228,754 | B2 * | 6/2007 | Matsumiya ............... 74/493 |
| 2005/0104353 | A1 * | 5/2005 | Ikeda et al. ............. 280/775 |
| 2006/0151984 | A1 * | 7/2006 | Higashino et al. ....... 280/775 |
| 2007/0068311 | A1 * | 3/2007 | Shimoda et al. .......... 74/493 |

FOREIGN PATENT DOCUMENTS

| JP | 50-19124 U | 6/1973 |
| JP | 62-19483 Y2 | 5/1987 |
| JP | 2-124763 U | 10/1990 |
| JP | 10-35511 A | 2/1998 |

* cited by examiner

Primary Examiner — Justin Krause
(74) Attorney, Agent, or Firm — Sughrue Mion, PLLC

(57) ABSTRACT

End portions of lower-side telescopic friction plates 61, 61 which lie to face a front side of a vehicle body are connected integrally by a connecting portion 612, and a lower end 617 of the connecting portion 612 is fixed to an outer circumference of an upper-side lower column 10A by means of welding. When an upper column 11 is fastened on to a vehicle body mounting bracket 3 for tilt and telescopic positioning of the upper column 11, the lower-side telescopic friction plates 61 and upper-side telescopic friction plates 62 are fastened together. The upper column 11 and the lower column 10 are connected together via the lower-side telescopic friction plates 6 and the upper-side telescopic friction plates 62, whereby the rigidity and vibration properties of a steering apparatus as a whole are enhanced.

8 Claims, 8 Drawing Sheets

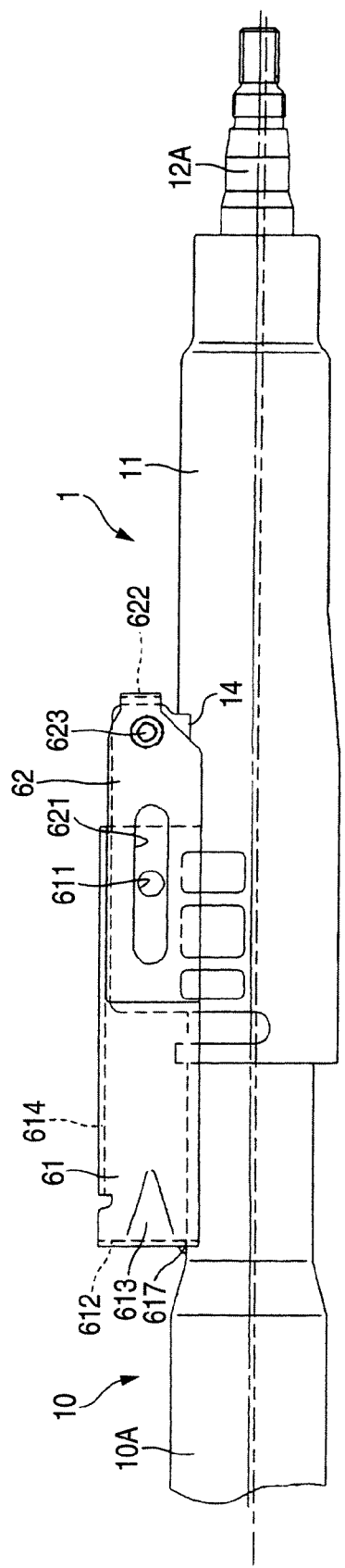
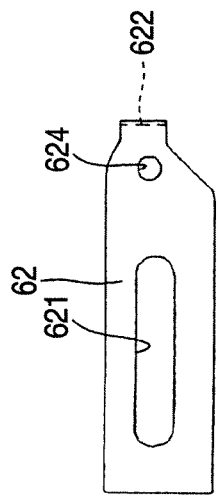
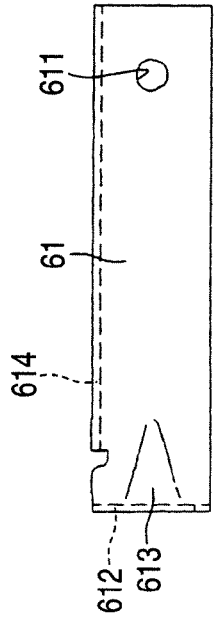

STEERING APPARATUS

TECHNICAL FIELD

The present invention relates to a steering apparatus and more particularly to a steering apparatus in which a telescopic position (a longitudinal position) of a steering wheel or both a telescopic position and a tilt position (an inclination angle) of the steering wheel can be adjusted according to the build or driving posture of a driver and which includes a clamp device for clamping strongly and rigidly a steering column by employing a plurality of friction plates in such a manner as not to move in an inclining direction as well as a longitudinal direction.

BACKGROUND ART

In a steering apparatus in which a telescopic position of a steering wheel or both a telescopic position and a tilt position of the steering wheel can be adjusted, after the telescopic position or both the telescopic position and the tilt position of the steering wheel are adjusted, an upper column needs to be clamped strongly and rigidly on to a vehicle body mounting bracket in such a manner as not to move from the clamped position. In view of this, a clamp device utilizing a single or a plurality of friction plates is provided for increasing the friction force used when the upper column is clamped, so as to clamp strongly and rigidly the upper column on to the vehicle body mounting bracket.

As a steering apparatus which includes a clamp device utilizing friction plates as described above, there is a steering apparatus described in Japanese Patent Unexamined Publication No. JP-A-10-35511. As is described in JP-A-10-35511, telescopic friction plates for clamping an upper column on to a vehicle body mounting bracket in a desired telescopic position are disposed on the upper column side which moves telescopically.

When the adjustment of the telescopic position is completed and the upper column is clamped on to the vehicle body mounting bracket, the upper column can be clamped strongly and rigidly on to the vehicle body mounting bracket by means of a frictional force produced by the telescopic friction plates when the upper column is so clamped.

However, the upper column fits on a lower column disposed towards a vehicular front side in such a manner as to move telescopically relative to the lower column so disposed. In order to realize a smooth telescopic movement of the upper column, a slight sliding gap is necessary in a fitting portion between the upper column and the lower column.

Consequently, even though the upper column is clamped strongly and rigidly on to the vehicle body mounting bracket, it has been inevitable that the rigidity and vibration properties of the steering apparatus as a whole are decreased due to the existence of the sliding gap in the fitting portion between the upper column and the lower column.

In order to increase the rigidity and vibration properties of the steering apparatus as a whole, the external dimensions and thicknesses of parts such as the upper column, the lower column and the vehicle body mounting bracket are increased, but this causes a problem that costs for parts as well as the weight of the steering apparatus and hence of the vehicle are increased.

SUMMARY OF THE INVENTION

The invention has been made in view of the situations and an object thereof is to provide a steering apparatus including a clamp device for clamping an upper column on to a vehicle body mounting bracket in a desired telescopic position in which the rigidity and vibration properties of the steering apparatus as a whole are increased without increasing the external dimensions and thicknesses of constituent parts involved.

In order to achieve the object, according to a first aspect of the invention, there is provided a steering apparatus including:

a lower column disposed on a front side of a vehicle body;

an upper column disposed on a vehicular rear side, fitted on the lower column so as to be adjusted with respect to its telescopic position and supporting rotatably a steering shaft on which a steering wheel is mounted;

a vehicle body mounting bracket which is adapted to be mounted on the vehicle body and which supports the upper column in such a manner that the telescopic position of the upper column is adjustable;

a lower-side telescopic friction plate fixed to the lower column;

an upper-side telescopic friction plate fixed to the upper column and adapted to move while having an overlapping portion relative to the lower-side telescopic friction plate; and a clamp device which fastens the overlapping portion between the lower-side telescopic friction plate and the upper-side telescopic friction plate on to the vehicle body mounting bracket, so as to clamp the upper column on to the vehicle body mounting bracket in a desired telescopic position.

According to a second aspect of the invention, it is adaptable that the lower column is an inner column and the upper column is an outer column.

According to a third aspect of the invention, it is adaptable that the lower-side telescopic friction plate and the upper-side telescopic friction plate are disposed further upwards on the vehicle body than axial centers of the lower column and the upper column.

According to a fourth aspect of the invention, it is adaptable that the lower-side telescopic friction plate is fixed to the lower column via a welding portion formed thereon.

According to a fifth aspect of the invention, it is adaptable that the lower-side telescopic friction plate is fixed to the lower column via a bolt.

According to a sixth aspect of the invention, it is adaptable that a circular hole is formed in the lower-side telescopic friction plate, a telescopic adjusting elongated groove is formed in the upper-side telescopic friction plate so as to extend in a longitudinal direction of the vehicle body, and a tightening rod penetrates the circular hole of the lower-side telescopic friction plate and the telescopic adjusting elongated groove of the upper-side telescopic friction plate.

According to a seventh aspect of the invention, it is adaptable the steering apparatus further including:

a clamp band which fits on an outer circumference of the lower column so as to be adjusted in a rotating direction and is adapted to be fixed to the lower column, wherein the lower-side telescopic friction plate is fixed to the clamp band.

According to an eighth aspect of the invention, it is adaptable that the steering apparatus further including:

a bolt for fastening and fixing the clamp band on to the outer circumference of the lower column.

According to a ninth aspect of the invention, it is adaptable that the lower-side telescopic friction plate is fixed to the clamp band via a welding portion formed thereon.

In the steering apparatus of the invention, the telescopic friction plate is made up of the lower-side telescopic friction plate and the upper-side friction plate, the lower-side telescopic friction plate is fixed to the lower column, and the upper-side telescopic friction plate which moves while having the overlapping portion relative to the lower-side telescopic friction plate according to the telescopic position of the upper column is fixed to the upper column. Furthermore, the clamp device is provided which fastens the overlapping portion between the lower-side telescopic friction plate and the upper-side telescopic friction plate on to the vehicle body mounting bracket, so as to clamp the upper column on to the vehicle body mounting bracket in the desired telescopic position.

Consequently, when the upper column is clamped on to the vehicle body mounting bracket, the upper column and the lower column are joined integrally via the lower-side telescopic friction plate and the upper-side friction plate which are clamped. Due to this, the rigidity and vibration properties of the steering apparatus as a whole are increased without increasing the external dimensions and thicknesses of the parts such as the upper column, the lower column, and the vehicle body mounting bracket.

BRIEF DESCRIPTION OF THE DRAWINGS

FIG. 4A is a front view showing a lower-side telescopic friction plate and an upper-side telescopic friction plate which lie in the vicinity of a fitting portion between the upper column and a lower column of Embodiment 1, which shows a state before assembled on to the vehicle body mounting bracket;

FIG. 4B is a view showing a lower-side telescopic friction plate of Embodiment 1;

FIG. 4C is a view showing a upper-side telescopic friction plate of Embodiment 1;

DETAILED DESCRIPTION OF THE PREFERRED EMBODIMENTS

In embodiments which will be described below, an example will be described in which the invention is applied to a tilt and telescopic type steering apparatus in which both a longitudinal position and an inclination angle of a steering wheel can be adjusted.

Embodiment 1

Figure 1:
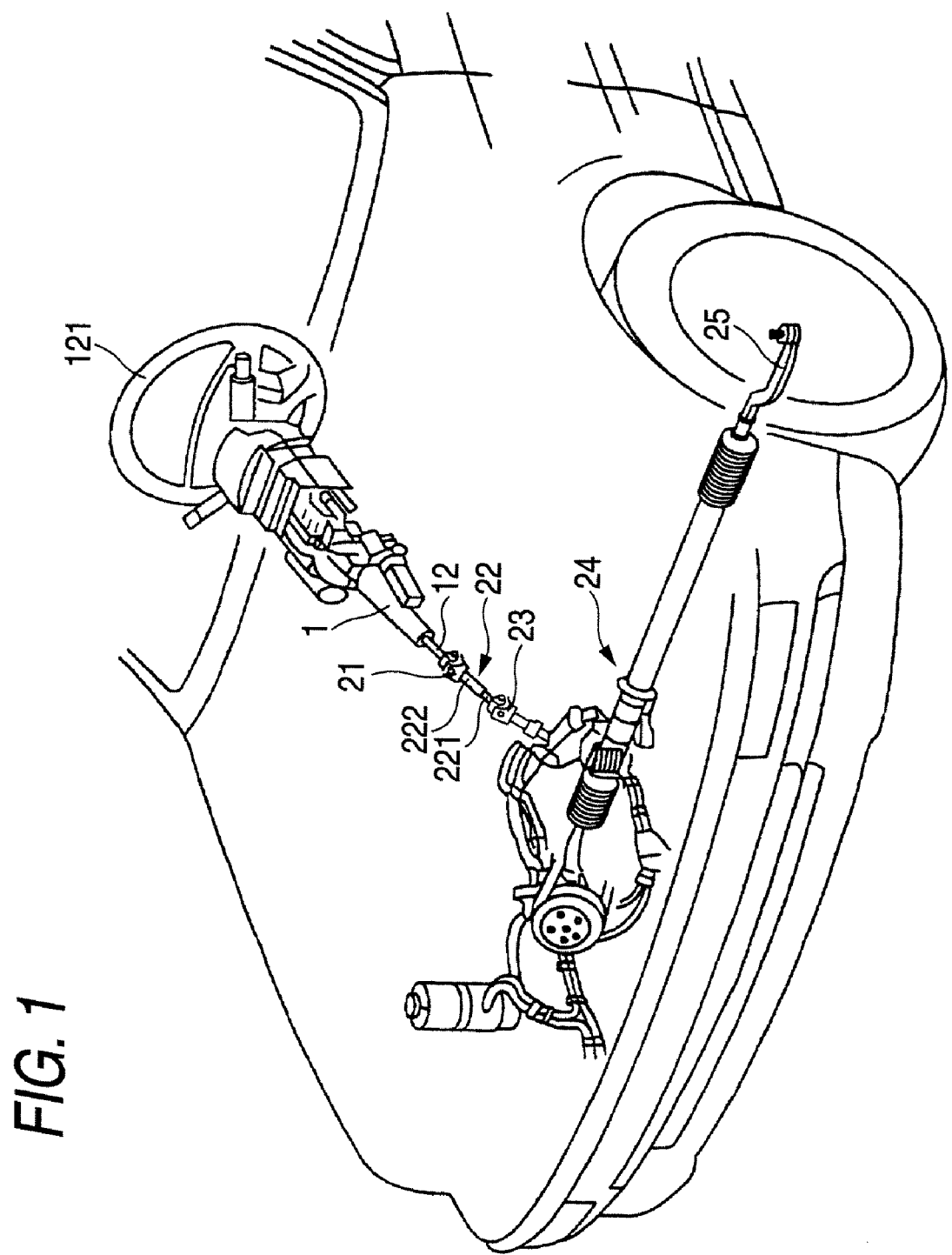
FIG. 1 is an overall perspective view showing a state in which a steering apparatus of the invention is mounted on a vehicle.

FIG. 1 is an overall perspective view showing a state in which a steering apparatus of the invention is mounted on a vehicle. As shown in FIG. 1, a hollow cylindrical column 1 is mounted on a vehicle body, and a steering shaft 12 is rotatably supported on this column 1. A steering wheel 121 is mounted on the steering shaft 12 at a right end (a vehicular rear side) thereof, and an intermediate shaft 22 is connected to a left end (a vehicular front side) of the steering shaft 12 via a universal joint 21.

The intermediate shaft 22 is made up of a solid intermediate inner shaft 221 on which male splines are formed and a hollow cylindrical intermediate outer shaft 222 in which female splines are formed, and the male splines on the intermediate inner shaft 221 fits in the female splines on the intermediate outer shaft 222 in such a manner as to allow the intermediate inner and outer shafts to extend or contract (slide) relative to each other and also to transmit rotational torque.

Furthermore, a vehicular rear side of the intermediate outer shaft 221 is connected to the universal joint 21, and a vehicular front side of the intermediate inner shaft 222 is connected to a universal joint 23. A pinion which meshes with a rack (not shown) of a steering gear 24 is connected to the universal joint 23.

When the driver operates to turn the steering wheel 121, the rotational force thereof is transmitted to the steering gear 24 via the steering shaft 12, the universal joint 21, the intermediate shaft 22, and the universal joint 23. This rotational force so transmitted then moves tie rods 25 via a rack-and-pinion mechanism to thereby change angles of steered wheels.

Figure 2:
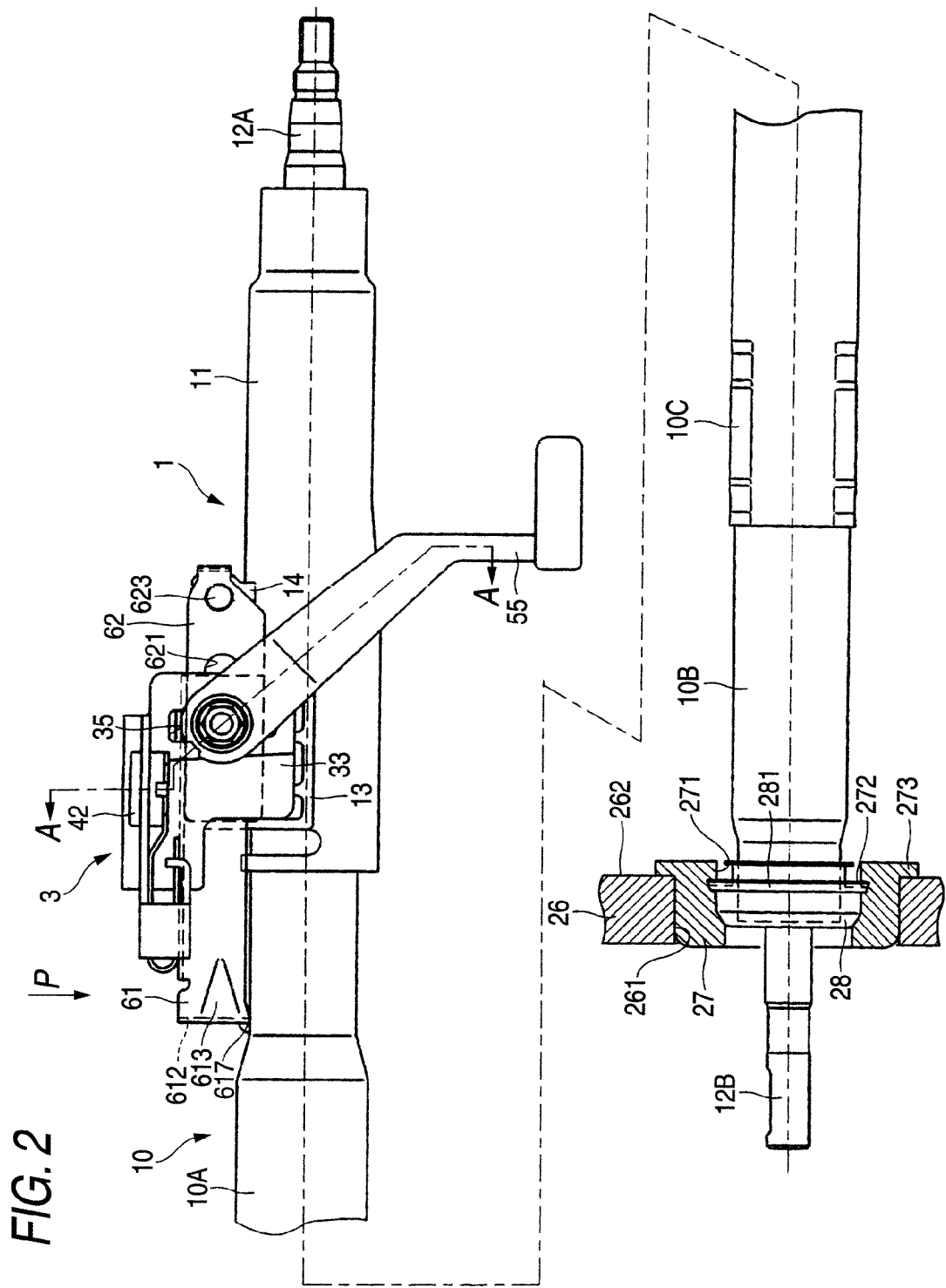
FIG. 2 is a front view showing a main part of the steering apparatus of Embodiment 1 of the invention.
Figure 3:
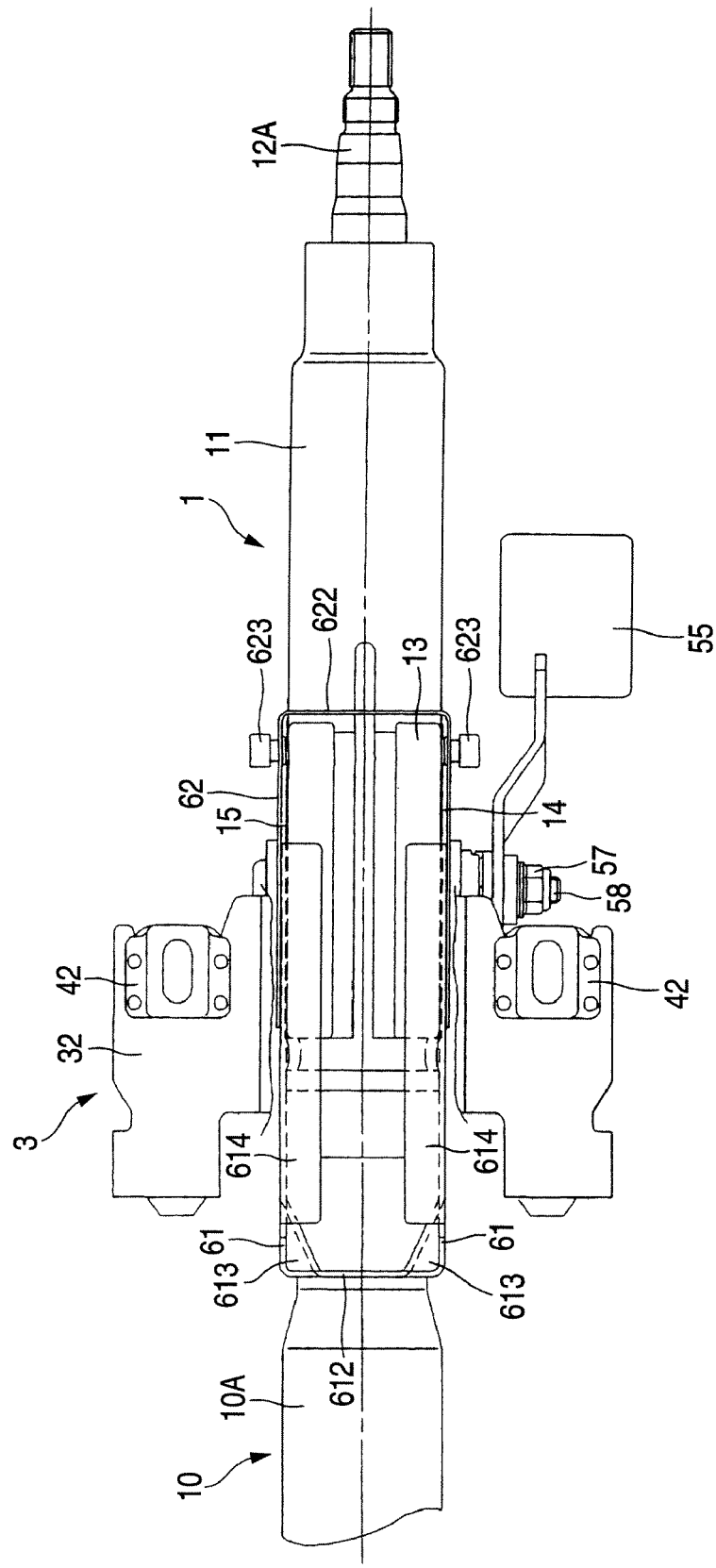
FIG. 3 is a view as seen in a direction indicated by an arrow P in FIG. 2, which shows the vicinity of a clamping portion of an upper column on to a vehicle body mounting bracket.
Figure 5:
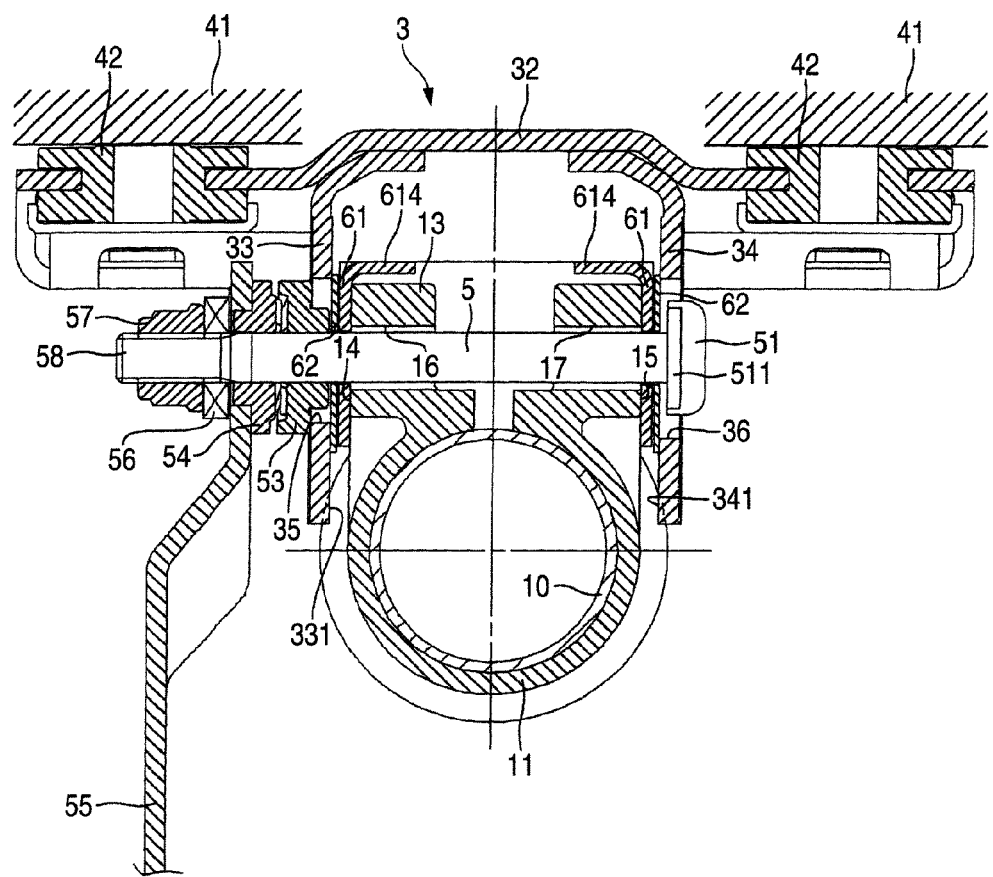
FIG. 5 is a sectional view taken along the line A-A in FIG. 2.

FIG. 2 is a front view showing a main part of the steering apparatus of Embodiment 1. FIG. 3 is a view as seen in a direction indicated by an arrow P in FIG. 2, which shows, the vicinity of a clamping portion of an upper column on to a vehicle body mounting bracket. FIG. 4 is a front view showing a lower-side telescopic friction plate and an upper-side telescopic friction plate which lie in the vicinity of a fitting portion between the upper column and a lower column, which shows a state before assembled on to the vehicle body mounting bracket. FIG. 5 is a sectional view taken along the line A-A in FIG. 2.

As shown in FIGS. 2 to 5, the column 1 is made up of a hollow cylindrical upper column (an outer column) 11 and a lower column (an inner column) 10 which fits in an left side (a vehicular front side) of the upper column 11 in such a manner as to slide in an axial direction thereof.

An upper steering shaft 12A is rotatably supported in the upper column 11, and the steering wheel 121 (refer to FIG. 1) is fixed to a right end (a vehicular rear side) of the upper steering shaft 12A.

In this embodiment of the invention, although the upper column 11 is an integral diecast product of aluminum, the upper column 11 may be such that a distance bracket is welded to a steel pipe. In addition, the upper column 11 may be a diecast produce of magnesium for the purpose of reducing the weight thereof.

A vehicle body mounting bracket 3 is mounted on the left side (the vehicular front side) of the upper column 11 in such a manner as to hold the upper column 11 from both left and right sides thereof (both end in width direction). The vehicle body mounting bracket 3 is mounted on a vehicle body 41 (refer to FIG. 5) via aluminum diecast capsules 42 in such a manner as to be removed in the vehicular front side.

When the driver is brought into collision with the steering wheel 121 as a secondary collision to thereby apply a large impact force to the steering wheel 121, the vehicle body mounting bracket 3 is removed from the capsules 42 in the vehicular front side and the upper column 11 is moved to be collapsed towards the vehicular front side while being guided by the lower column 10, so as to absorb impact energy produced at the time of impact.

The lower column 10 is made up of an upper-side lower column 10A and a lower-side lower column 10B. A vehicular rear side of the upper-side lower column 10A (the right side in FIG. 2) is fitted in the vehicular front side of the upper column 11 (the left side in FIG. 2) in such a manner as to slide in the axial direction. A lower steering shaft 12B is supported rotatably on the lower-side lower column 10B and the lower steering shaft 12B is connected to the universal joint 21 in FIG. 1 at a vehicular front side thereof (left end of FIG. 2). The lower steering shaft 12B is brought into spline engagement of the upper steering shaft 12A and can transmit the rotational torque of the upper steering shaft 12A irrespective of the telescopic position of the upper column 11.

An outer circumferential surface of a vehicular front side end of the upper-side lower column 10A is crimped to form a diameter contracted portion 10C in the fitting portion between the upper-side lower column 10A and the lower-side lower column 10B. The fitting of the upper-side lower column 10A and the lower-side lower column 10B on or in the other is implemented by press fit.

Consequently, when impact load is applied to the lower-side lower column 10B towards the rear side of the vehicle at the time of primary collision, the lower-side lower column 10B moves to collapse towards the vehicular rear side relative to the upper-side lower column 10A against frictional force which is produced in the fitting portion 10C, so as to mitigate the impact load produced as a result of the primary collision.

An outer circumference of a grommet 27 which is made from synthetic rubber is press fitted in a through hole 261 formed in a toe board 26 which partitions a passenger compartment from an engine compartment. A flange 273 which is formed at a vehicular rear side of the grommet 27 is brought into abutment with an end face 262 of the vehicular rear side of the toe board 26 so as to prevent the movement of the grommet 27 towards the vehicular front side.

In addition, a resin cap 28 is press fitted on an outer circumference of an vehicular front side of the lower-side lower column 10B. An outer circumference of the cap 28 is fitted in a through hole 271 of the grommet 27, and a flange 281 on the outer circumference of the cap 28 is fitted in an annular groove 272 on an inner circumference of the through hole 271, so as to prevent an axial movement of the cap 28 relative to the grommet 27.

Consequently, when the toe board 26 is deformed towards the vehicular rear side by impact force produced as a result of primary collision, impact load towards the vehicular rear side is applied to the cap 28 via the grommet 27, the lower-side lower column 10B moves to collapse towards the vehicular rear side.

In addition, when the tilt position (inclination angle) of the steering wheel 121 is adjusted, the grommet 27 is elastically deformed according to the tile position of the lower-side lower column 10B (including the cap 28), the tile position of the lower-side lower column 10 can be adjusted easily.

The vehicle body mounting bracket 3 has an upper plate 32 and side plates 33, 34 which extend downwards from the upper plate 32. A distance bracket 13 is formed integrally on the upper column 11 in such a manner as to project upwards therefrom.

Sides 14, 15 of the distance bracket 13 slidably contacts with inner sides 331, 341 of the side plates 33, 34 of the vehicle body mounting bracket 3 via lower-side telescopic friction plates 61, 61 which are fixed to the upper-side lower column 10A and upper-side telescopic friction plates 62, 62 which are fixed to the upper column 11.

Tilt adjustment elongated grooves 35, 36 are formed in the side plates 33, 34 of the vehicle body mounting bracket 3, respectively. Telescopic adjustment elongated grooves 16, 17 are formed in the distance bracket 13 in such a manner as not only to extend transversely in FIG. 5 but also to extend long in the direction of an axial center of the upper column 11.

A round rod-like tightening rod 5 is inserted from the right side in FIG. 5 so as to penetrate the tilt adjustment elongated grooves 35, 36 and the telescopic adjustment elongated grooves 16 17. A cylindrical head portion 51 is formed at a right end of the tightening rod 5. A rotation preventive portion 511 is formed on an outside diameter portion of the head portion 51, and this rotation preventive portion 511 is formed to have a rectangular cross section which is slightly narrower in width than the groove width of the tilt adjustment elongated groove 36.

The rotation preventive portion 511 fits in the tilt adjustment elongated groove 36, so as to prevent the rotation of the tightening rod 5 relative to the vehicle body mounting bracket 3 and allows the tightening rod 5 to slide along the tilt adjustment elongated groove 36 when the tilt position of the upper column 11 is adjusted.

The lower-side telescopic friction plates 61, 61 are brought into sliding contact with the sides 14, 15 of the distance bracket 13 of the upper column 11 and are disposed in such a manner as to extend in a telescopic direction (a horizontal direction in FIGS. 2 to 4). Circular holes 611 (refer to FIG. 4B) are formed in the lower-side telescopic friction plates 61, 61 through which the tightening rod 5 passes.

In addition, the upper-side telescopic friction plates 62, 62 are brought into sliding contact with outer sides of the lower-side telescopic friction plates 61, 61, respectively, and are disposed in such a manner as to extend in the telescopic direction (the horizontal direction in FIGS. 2 to 4). Telescopic adjustment elongated grooves 621 (refer to FIG. 4C) are formed in the upper-side telescopic friction plates 62, 62 through which the tightening rod 5 passes.

The lower-side telescopic friction plates 61, 61 and the upper-side telescopic friction plates 62, 62 are disposed further upwards on the vehicle body than an axial center of the lower column 10 and an axial center of the upper column 11.

Vehicular front end portions of the lower-side telescopic friction plates 61, 61 (the left end in FIGS. 2 to 4) are connected together by a connecting portion 612. A lower end 617 of the connecting portion 612 is fixed to an outer circumference of the upper-side lower column 10A via a welding portion formed on the lower-side telescopic friction plates 61, 61.

Reinforcement ribs 613, 613 are formed in the vicinity of joining portions between the lower-side telescopic friction plates 61, 61 and the connecting portion 612. In addition, reinforcement bent portions 614, 614, which are bent at right angles from upper ends of the lower-side telescopic friction plates 61, 61, are formed at the upper ends of the lower-side telescopic friction plates 61, 61. The rigidities of the lower-side telescopic friction plates 61, 61 are enhanced by these reinforcement ribs 613, 613 and the reinforcement bent portions 614, 614, so as to enhance the rigidity when the lower-side telescopic friction plates 61, 61 and the upper-side lower column 10A are joined together.

Vehicular rear side end portions of the upper-side telescopic friction plates 62, 62 (the right end in FIGS. 2 to 4) are connected together by a connecting portion 622. Circular holes (refer to FIG. 4C) 624, 624 are formed, respectively, in the vehicular rear side end portions of the upper-side telescopic friction plates 62, 62, and the upper-side telescopic friction plates 62, 62 are fixed, respectively, to the sides 14, 15 of the distance bracket 13 by rivets 623, 623 penetrating the circular holes 62, 62. When the upper column 11 being made into a diecast product of aluminum, at the time of forming an upper column 11 by die casting, it may be adaptable that projecting portions penetrating the circular holes 624, 624 are cast integrally with the upper column 11, so that rivets may be omitted.

In this embodiment of the invention, while the number of the lower-side telescopic friction plates 61, 61 and the upper-side telescopic friction plates 62, 62 are one on each of the sides 14, 15 of the distance bracket 13, however, it is adaptable that the number is two or more. In addition, in the embodiment of the invention, while the lower-side telescopic friction plates 61, 61 and the upper-side telescopic friction plates 62, 62 are each disposed on both the side 14 and the side 15, they may each be disposed on either of the sides 14 and 15.

As shown in FIG. 5, a stationary cam 53, a movable cam 54, an operation lever 55, a thrust bearing 56 and a nut 57 are fitted sequentially in this order on an outer circumference of a left end of the tightening rod 5, and a female screw formed on an inside diameter portion of the nut 57 is screwed on a male screw formed on the left end of the tightening rod 5.

A rotation preventive portion (not shown) having a rectangular cross section is formed on an outer circumference of a right end of the stationary cam 53. This rotation preventive portion fits in the tilt adjustment elongated groove 35 so as to prevent the rotation of the stationary cam 53 relative to the vehicle body mounting bracket 3 and also to allows the stationary cam 53 to slide along the tilt adjustment elongated groove 35 when the tilt position of the upper column 11 is adjusted.

Complementary inclined cam surfaces are formed on end faces of the stationary cam 53 and the movable cam 54 which face each other, and the cam surfaces so formed are made to mesh with each other. When the operation lever 55 connected to a left side of the movable cam 54 is operated manually, the movable cam 54 rotates relative to the stationary cam 53.

When the operation lever 55 is rotated in a clamping direction, a peak of the inclined cam surface of the movable cam 54 rides on a peak of the inclined cam surface of the stationary cam 53, whereby the tightening rod 5 is pulled leftwards in FIG. 5 and at the same time, the stationary cam 53 is pushed rightwards in FIG. 5.

The right-side side plate 34 is pushed leftwards by a left-end face of the head portion 51 of the tightening rod 5, whereby the side plate 34 is deformed inwards. Then, the inner side 341 of the side plate 34 pushes strongly the overlapping portion between the upper-side telescopic friction plate 62 and the lower-side telescopic friction plate 61 against the side 14 of the distance bracket 13.

At the same time, the left-side side plate 33 is pushed rightwards by a right end face of the stationary cam 53, so as to deform the side plate 33 inwards. Then, the inner side 331 of the side plate 33 pushes strongly the overlapping portion between the upper-side telescopic friction plate 62 and the lower-side telescopic friction plate 61 against the side 14 of the distance bracket 13.

In this way, the distance bracket 13 of the upper column 11 can be fastened on to the vehicle body mounting bracket 3 for tilt and telescopic positioning of the upper column by means of large friction force acting between both the sides of the upper-side telescopic friction plate 62 and the lower-side telescopic friction plate 61. The clamp device of this embodiment of the invention is made up of the stationary cam 53, the movable cam 54, the tightening rod 5 and the operation lever 55.

Consequently, the upper column 11 is fixed relative to the vehicle body mounting bracket 3, a displacement in the tilt direction and a displacement in the telescopic direction of the upper column 11 are prevented. The upper column 11 is fastened on to the vehicle body mounting bracket 3 with a large holding force by virtue of large frictional force acting between the upper-side telescopic friction plate 62 and the lower-side telescopic friction plate 61.

As has been described above, when the upper column 11 is fastened on to the vehicle body mounting bracket 3 for determining tilt and telescopic position of the upper column 11, the lower-side telescopic friction plate 62 and the upper-side telescopic friction plate 62 are fastened together.

The lower-side telescopic friction plate 61 is fixed to the outer circumference of the upper-side lower column 10A via a welding portion formed on the lower-side telescopic friction plate 61, and the upper-side telescopic friction plate 62 is fixed to the upper column 11 by means of the rivets 623, 623.

Consequently, the upper column 11 and the lower column 10 are connected integrally via the lower-side telescopic friction plates 61 and the upper-side telescopic friction plates 62. Thus, even though there exists a sliding gap in the fitting portion between the upper column 11 and the lower column 10, the rigidity and vibration properties of the steering apparatus as a whole are enhanced. In addition, since the external dimensions and thicknesses of the upper column 11, the lower column 10 and the vehicle body mounting bracket 3 do not have to be increased, an increase in weight and parts costs is suppressed.

Next, when the driver rotates the operation lever 55 in a direction in which the fastening is released, the side plates 33, 34 of the vehicle body mounting bracket 3 are elastically restored in opposite directions to the holding directions, respectively, whereby the frictional force acting between the lower-side telescopic plates 61 and the upper-side telescopic plates 62 is also released.

Due to this, the upper column 11 is put in a free state relative to the side plates 33, 34 of the vehicle body mounting bracket 33. In this state, by displacing the tightening rod 5 in the tilt direction while causing it to be guided in the tile adjustment grooves 35, 36, the adjustment of the steering wheel 121 in the tilt direction can be implemented arbitrarily.

In addition, by displacing the upper column 11 in the telescopic direction while causing it to be guided along the tightening rod 5 in the telescopic adjustment groves 621 in the upper-side telescopic friction plates 62 and the telescopic adjustment elongated grooves 16, 17 in the distance bracket 13, the adjustment of the steering wheel 121 in the telescopic direction can be adjusted arbitrarily.

Embodiment 2

Figure 6:
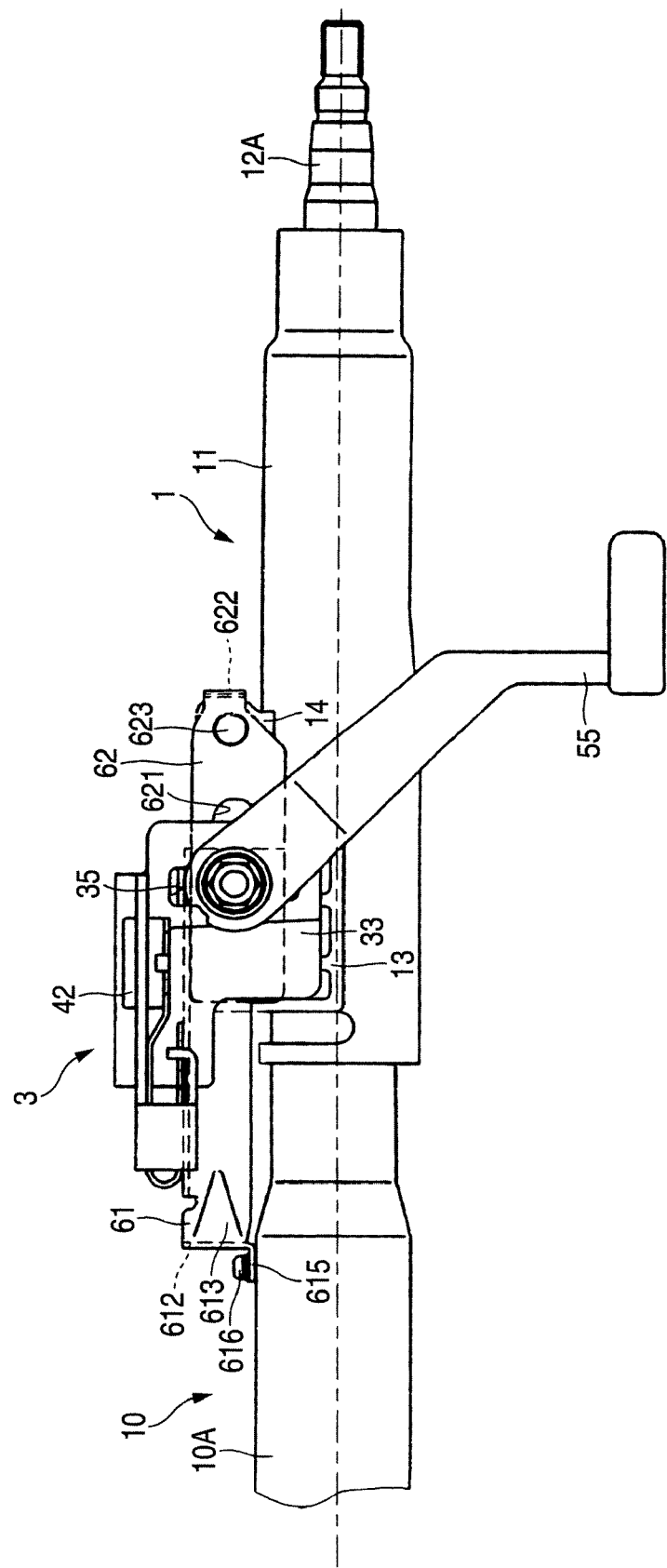
FIG. 6 is a front view showing a main part of a steering apparatus of Embodiment 2 of the invention.

Next, Embodiment 2 of the invention will be described. FIG. 6 is a front view showing a main part of a steering apparatus of Embodiment 2 of the invention. In the following description, only different constructions from the constructions of the embodiment that has been described above will be described, and a repeated description of similar constructions will be omitted. In addition, like reference numerals will be imparted to like components.

Embodiment 2 is an example in which the way of fixing an upper-side lower column 10A to lower-side telescopic friction plates 61, 61 is changed from welding (welding portion) to bolting.

As shown in FIG. 6, a steering apparatus of Embodiment 2 of the invention is, as with Embodiment 1, such that the lower-side telescopic friction plates 61, 61 are disposed in such a manner as to extend in a telescopic direction (a horizontal direction in FIG. 6). In addition, upper-side telescopic friction plates 62, 62, which are brought into sliding contact, respectively, with outer sides of the lower-side telescopic friction plates 61, 61, are disposed in such a manner as to extend in the telescopic direction (the horizontal direction in FIG. 6).

As with Embodiment 1, a vehicular rear side end portions of the upper-side telescopic friction plates 62, 62 (the right end in FIG. 6) are connected together by a connecting portion 622, and the vehicular rear side end portions of the upper-side telescopic friction plates 62, 62 are fixed to sides 14, 15 of a distance bracket 13 with rivets 623, 623. In addition, the rivets 623 can be replaced with other fixing means such as bolts and nuts (this will be true in other embodiment, too).

Vehicular front side end portions of the lower-side telescopic friction plates 61, 61 (the left end in FIG. 6) are connected integrally by a connecting portion 612, and a bent portion 615, which is bent at right angles towards the vehicular front side, is formed on a lower end of the connecting portion 612. By fixing the bent portion 615 to an outer circumference of an upper-side lower column 10A with a plurality of bolts 616, the lower-side telescopic friction plates 61, 61 are joined integrally to the upper-side lower column 10A.

Embodiment 3

Figure 7A:
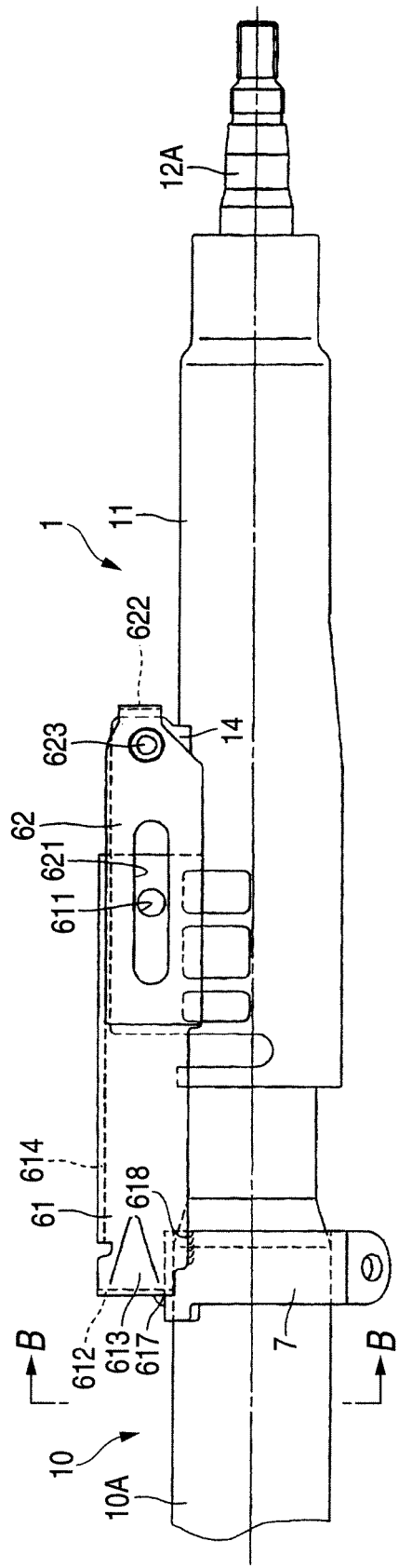
FIG. 7A is a front view showing a lower-side telescopic friction plate and an upper-side telescopic friction plate which lie in the vicinity of a fitting portion between an upper column and a lower column of Embodiment 3 of the invention before they are assembled in a vehicle body mounting bracket, the view corresponding to FIG. 4 showing Embodiment 1.
Figure 7C:
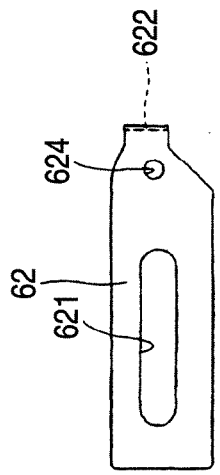
FIG. 7C is a view showing a upper-side telescopic friction plate of Embodiment 3.
Figure 7B:
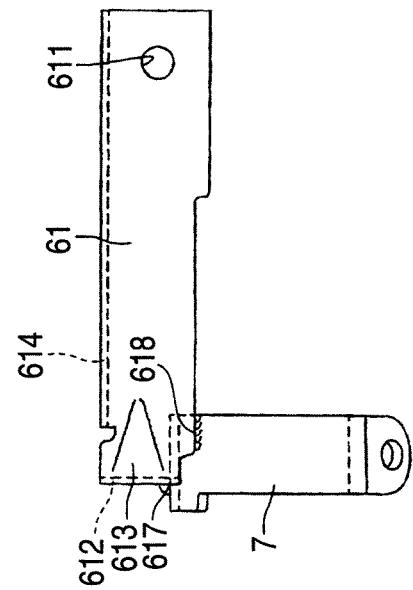
FIG. 7B is a view showing a lower-side telescopic friction plate of Embodiment 3.
Figure 8A:
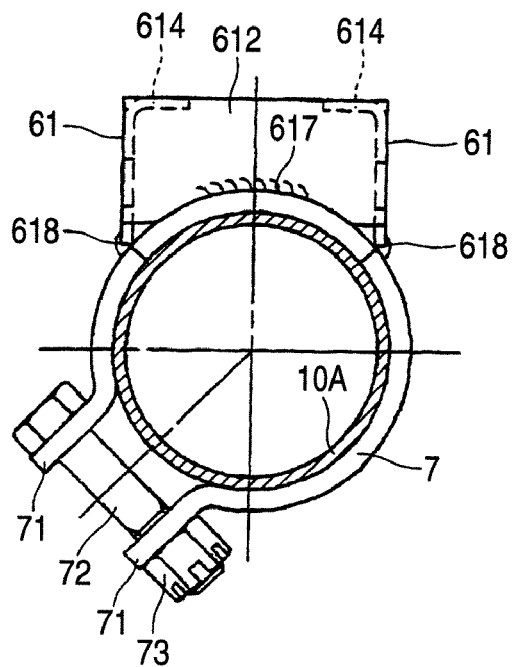
FIG. 8A is a sectional view taken along the line B-B in FIG. 7.

Next, Embodiment 3 of the invention will be described. FIG. 7 is a front view showing a lower-side telescopic friction plate and an upper-side telescopic friction plate which lie in the vicinity of a fitting portion between an upper column and a lower column of Embodiment 3 of the invention before they are assembled in a vehicle body mounting bracket, the view corresponding to FIG. 4 showing Embodiment 1. FIG. 8A is a sectional view taken along the line B-B in FIG. 7. In the following description, only different constructions from the constructions of the embodiment that has been described above will be described, and a repeated description of similar constructions will be omitted. In addition, like reference numerals will be imparted to like components.

Embodiment 3 is an example in which lower-side telescopic friction plates 61, 61 are fixed to a clamp band 7 which fits on an upper-side lower column 10A in such a manner as to be adjusted in a rotational direction.

As shown in FIG. 7, a steering apparatus of Embodiment 3 of the invention is, as with Embodiment 1, such that the lower-side telescopic friction plates 61, 61 are disposed in such a manner as to extend in a telescopic direction (a horizontal direction in FIG. 7). In addition, upper-side telescopic friction plates 62, 62, which are brought into sliding contact, respectively, with outer sides of the lower-side telescopic friction plates 61, 61, are disposed in such a manner as to extend in the telescopic direction (the horizontal direction in FIG. 7).

Vehicular rear side end portions of the upper-side telescopic friction plates 62, 62 (the right end in FIG. 7) are connected together by a connecting portion 622, and the vehicular rear side end portions of the upper-side telescopic friction plates 62, 62 are fixed to sides 14, 15 of a distance bracket 13 with rivets 623, 623.

The lower-side telescopic friction plates 61, 61 and the upper-side telescopic friction plates 62, 62 are disposed further upwards on the vehicle body than an axial center of a lower column 10a and an axial center of an upper column 11.

Vehicular front side end portions of the lower-side telescopic friction plates 61, 61 (the left end in FIG. 7) are connected integrally by a connecting portion 612. A lower end 617 of the vehicular front side end portion of the connection portion 612 and lower ends 618, 618 of a vehicular lateral side of the lower-side telescopic friction plates 61, 61 are fixed to an outer circumference of a clamp band 7 via a welding portion formed thereon.

The clamp band 7 is formed by bending a substantially rectangular flat plate into an annular shape and fits on an outer circumference of the upper-side lower column 10A in such a manner as to be adjusted in a rotational direction along the outer circumference of the upper-side lower column 10A. Tightening plate portions 71, 71 (refer to FIG. 8A) are formed at both ends of the annular clamp band 7 in such a manner as to protrude radially outwards.

When a bolt 72 is inserted into bolt holes (not shown) in the tightening plate portions 71, 71 and a nut 73 is screwed on an male screw of the bolt 72, the clamp band 7 is made small in diameter, and the outer circumference of the upper-side lower column 10A is tightened by the clamp band 7, whereby the clamp band 7 is fixed to the outer circumference of the upper-side lower column 10A.

When assembling together the upper-side telescopic friction plates 62, 62 and the lower-side telescopic friction plates 61, 61, the nut 73 is kept slightly loosened, so that the clamp band 7 can freely be adjusted in the rotational direction along the outer circumference of the upper-side lower column 10A.

Next, a vehicular front side (a left side of FIG. 7) of the upper column 11 is fitted on a vehicular rear side of the upper-side lower column 10A (a right side in FIG. 7) in such a manner as to slide in the axial direction. As this occurs, the upper column 11 is assembled on the upper-side lower column 10A such that the lower-side telescopic friction plates 61, 61 are brought into sliding contact with sides 14, 15 of a distance bracket 13 of the upper column 11 and outer sides of the lower-side telescopic friction plates 61, 61 are brought into sliding contact with the upper-side telescopic friction plates 62, 62 therealong.

Since the clamp band 7 freely rotates along the outer circumference of the upper-side lower column 10A, the lower-side telescopic friction plates 61, 61 can be assembled accurately while following the upper-side telescopic friction plates 62, 62, whereby the accurate assemblage of the lower-side telescopic friction plates 61, 61 and the upper-side telescopic friction plate 62, 62 can be implemented within a short period of time.

When the assemblage of the lower-side telescopic friction plates 61, 61 and the upper-side telescopic friction plate 62, 62 is completed, the nut 73 is screwed on the male screw of the bolt 72 strongly so as to make small the clamp band 7 in diameter, whereby the clamp band 7 only has to be fixed to the outer circumference of the upper-side lower column 10A.

When an operation lever 55 (refer to FIG. 5) is rotated in a clamping direction, the upper column 11 and the lower column 10 are connected integrally via the lower-side telescopic friction plates 61 and the upper-side telescopic friction plates 62, and even though a sliding gap exists in the fitting portion between the upper column 11 and the lower column 10, the rigidity and vibration properties of the steering apparatus as a whole are enhanced.

Figure 8B:
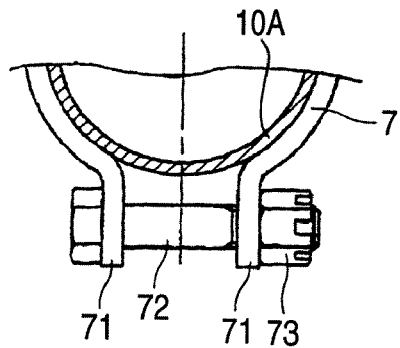
FIG. 8B show a modified example of FIG. 8A.
Figure 8C:
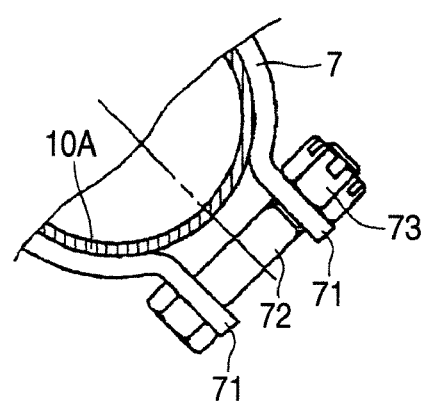
FIG. 8C show another modified example of FIG. 8A.

FIGS. 8B and 8C show modified examples of the embodiment shown in FIG. 8A. FIGS. 8B and 8C are figure corresponding to FIG. 8A from which lower-side telescopic friction plates 61 are omitted. In FIG. 8A, the tightening plate portions 71, 71 of the clamp band 7 are disposed obliquely downwards to the left of the upper-side lower column 10A as viewed in FIG. 8A.

The tightening plate portions 71, 71 can be disposed in various positions in consideration of facilitation in assembling the nut 73 and the bolt 72, interference of the tightening plate portions 71, 71 with other equipment when the steering apparatus is assembled on to the vehicle and the like. Namely, as shown in FIG. 8B, the tightening plate portions 71, 71 may be disposed to lie directly below the upper-side lower column 10A. In addition, as shown in FIG. 8C, the tightening plate portions 71, 71 may be disposed to lie obliquely downwards to the right of the upper-side lower column 10A.

In the embodiment, circular holes 611 are formed in the lower-side telescopic friction plates 61, and a tightening rod 5 passed through the circular holes 611 also passes through tile adjustment elongated grooves 35, 36. Consequently, even though load directed towards the vehicular rear side is applied from the upper-side lower column 10A to the lower-side telescopic friction plates 61 at the time of primary collision, the tightening rod 5 is interrupted by the tilt adjustment elongated grooves 35, 36 and hence cannot move towards the vehicular rear side. Consequently, the load directed towards the vehicular rear side is not transmitted to the upper-side telescopic friction plates 62, an input from the road surface to the upper column 11 can be prevented.

In the embodiments, while the lower column 10 is made up of the inner column and the upper column 11 is made up of the outer column, the lower column 10 may be made to make up an outer column, while the upper column 11 may be made to make up an inner column.

In addition, in the embodiments, while the invention has been described as being applied to the steering apparatus in which both the tilt position adjustment and the telescopic position adjustment are enabled, the invention may be applied to a steering apparatus in which only the telescopic position adjustment is enabled. Furthermore, in the embodiments, while the circular holes 611 through the tightening rod 5 passes are formed in the lower-side telescopic friction plates 61, 61, the holes are not limited to the circular shape but may be formed into an elongated hole which is long in the telescopic direction.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A steering apparatus comprising:
a lower column disposed on a front side of a vehicle body;
an upper column disposed on a vehicular rear side, fitted on the lower column so as to be adjusted with respect to its telescopic position and supporting rotatably a steering shaft on which a steering wheel is mounted;
a vehicle body mounting bracket which is adapted to be mounted on the vehicle body and which supports the upper column in such a manner that the telescopic position of the upper column is adjustable;
a lower-side telescopic friction plate fixed to the lower column;
an upper-side telescopic friction plate fixed to the upper column and adapted to move while having an overlapping portion relative to the lower-side telescopic friction plate; and
a clamp device which fastens the overlapping portion between the lower-side telescopic friction plate and the upper-side telescopic friction plate on to the vehicle body mounting bracket, so as to clamp the upper column on to the vehicle body mounting bracket in a desired telescopic position, wherein
a circular hole is formed in the lower-side telescopic friction plate,
a telescopic adjusting elongated groove is formed in the upper-side telescopic friction plate so as to extend in a longitudinal direction of the vehicle body, and
a tightening rod penetrates the circular hole of the lower-side telescopic friction plate and the telescopic adjusting elongated groove of the upper-side telescopic friction plate.

2. The steering apparatus as set forth in claim 1, wherein the lower column is an inner column and the upper column is an outer column.

3. The steering apparatus as set forth in claim 1, wherein the lower-side telescopic friction plate and the upper-side telescopic friction plate are disposed further upwards on the vehicle body than axial centers of the lower column and the upper column.

4. The steering apparatus as set forth in claim 1, wherein the lower-side telescopic friction plate is fixed to the lower column via a welding portion formed thereon.

5. The steering apparatus as set forth in claim 1, wherein the lower-side telescopic friction plate is fixed to the lower column via a bolt.

6. The steering apparatus as set forth in claim 1, further comprising:
a clamp band which fits on an outer circumference of the lower column so as to be adjusted in a rotating direction and is adapted to be fixed to the lower column, wherein the lower-side telescopic friction plate is fixed to the clamp band.

7. The steering apparatus as set forth in claim 6, further comprising:
a bolt for fastening and fixing the clamp band on to the outer circumference of the lower column.

8. The steering apparatus as set forth in claim 6, wherein the lower-side telescopic friction plate is fixed to the clamp band via a welding portion formed thereon.

* * * * *